US008190560B2

(12) United States Patent
Todaka

(10) Patent No.: US 8,190,560 B2
(45) Date of Patent: May 29, 2012

(54) WORKFLOW EXECUTION SYSTEM, WORKFLOW EXECUTION APPARATUS, AND CONTROL METHOD FOR THEM

(75) Inventor: Shinji Todaka, Inagi (JP)

(73) Assignee: Canon Kabushiki Kaisha, Tokyo (JP)

( * ) Notice: Subject to any disclaimer, the term of this patent is extended or adjusted under 35 U.S.C. 154(b) by 264 days.

(21) Appl. No.: 12/623,023

(22) Filed: Nov. 20, 2009

(65) Prior Publication Data

US 2010/0131459 A1    May 27, 2010

(30) Foreign Application Priority Data

Nov. 21, 2008    (JP) ................................ 2008-298168

(51) Int. Cl.
*G06F 17/30* (2006.01)
(52) U.S. Cl. ...................................................... 707/608
(58) Field of Classification Search ................. 707/608, 707/609, 705, 766, 790, 821
See application file for complete search history.

(56) References Cited

U.S. PATENT DOCUMENTS

| 7,054,899 | B1 * | 5/2006 | Yamamoto | 709/202 |
|---|---|---|---|---|
| 8,099,384 | B2 * | 1/2012 | Miyazawa et al. | 707/603 |
| 2007/0192407 | A1 * | 8/2007 | Kim et al. | 709/203 |
| 2007/0219839 | A1 * | 9/2007 | Tanabe | 705/8 |
| 2008/0052724 | A1 * | 2/2008 | Numata | 718/107 |
| 2008/0063423 | A1 * | 3/2008 | Matoba | 399/76 |
| 2008/0285073 | A1 * | 11/2008 | Sawayanagi et al. | 358/1.15 |
| 2009/0051959 | A1 * | 2/2009 | Matsui et al. | 358/1.14 |
| 2010/0011369 | A1 * | 1/2010 | Uchida | 718/104 |
| 2010/0131459 | A1 * | 5/2010 | Todaka | 707/608 |

FOREIGN PATENT DOCUMENTS

| JP | 2000-250922 | 9/2000 |
|---|---|---|
| JP | 2001-357051 | 12/2001 |

* cited by examiner

*Primary Examiner* — Fred I Ehichioya
(74) *Attorney, Agent, or Firm* — Canon USA Inc. IP Division

(57) ABSTRACT

In a system that realizes a workflow by a plurality of devices (workflow execution apparatuses) while cooperating with one another in serverless environment, the system enables search for a file used in the workflow, even if a file name used in the workflow of each device is changed.

13 Claims, 11 Drawing Sheets

| No | Flow ID | Related Document | Status | Date |
|----|---------|------------------|--------|------|
| 01003 | F0001 | 01\Scan0103 | OK | 2007/09/28 09:19:35 |
| 01004 | F0003 | – | NG | 2007/09/28 09:56:00 |
| 01005 | F0032 | 03\Doc00021 | OK | 2007/09/29 10:20:12 |
| 01006 | F0001 | 01\Scan0108 | OK | 2007/09/30 10:20:15 |

6020

| No | Job Type | Source | Destination | Status | Date |
|----|----------|--------|-------------|--------|------|
| 01003 | Copy | – | – | OK | 2007/09/28 09:19:35 |
| 01004 | Print form Box | 02\Doc0020 | – | NG | 2007/09/28 09:35:00 |
| 01005 | Scan to Box | – | 01\Scan0103 | OK | 2007/09/28 10:20:12 |
| 01006 | Send from Box | 01\Scan0103 | Device | OK | 2007/09/28 10:20:15 |
| 01007 | Copy | – | – | OK | 2007/09/28 12:35:46 |
| 01008 | Copy | – | – | OK | 2007/09/28 11:20:55 |
| 01009 | Scan to Box | – | 08\Scan0104 | OK | 2007/09/28 12:35:10 |

6030

| No | Job Type | Source | Destination | Status | Date |
|----|----------|--------|-------------|--------|------|
| 02345 | PDL Print | PC002 | – | OK | 2007/09/28 08:45:13 |
| 02346 | Receive to Box | DeviceA | 03\Rev0033 | OK | 2007/09/28 10:20:15 |
| 02347 | Merge | 08\Doc3 | 03\Rev0033 | OK | 2007/09/28 10:20:40 |
| 02348 | Send from Box | 03\Rev0033 | Device C | OK | 2007/09/28 10:20:45 |
| 02349 | Copy | – | – | OK | 2007/09/28 12:35:46 |
| 02350 | Copy | – | – | OK | 2007/09/28 15:20:55 |
| 02351 | Scan to Box | – | 07\Scan0102 | OK | 2007/09/28 17:35:10 |

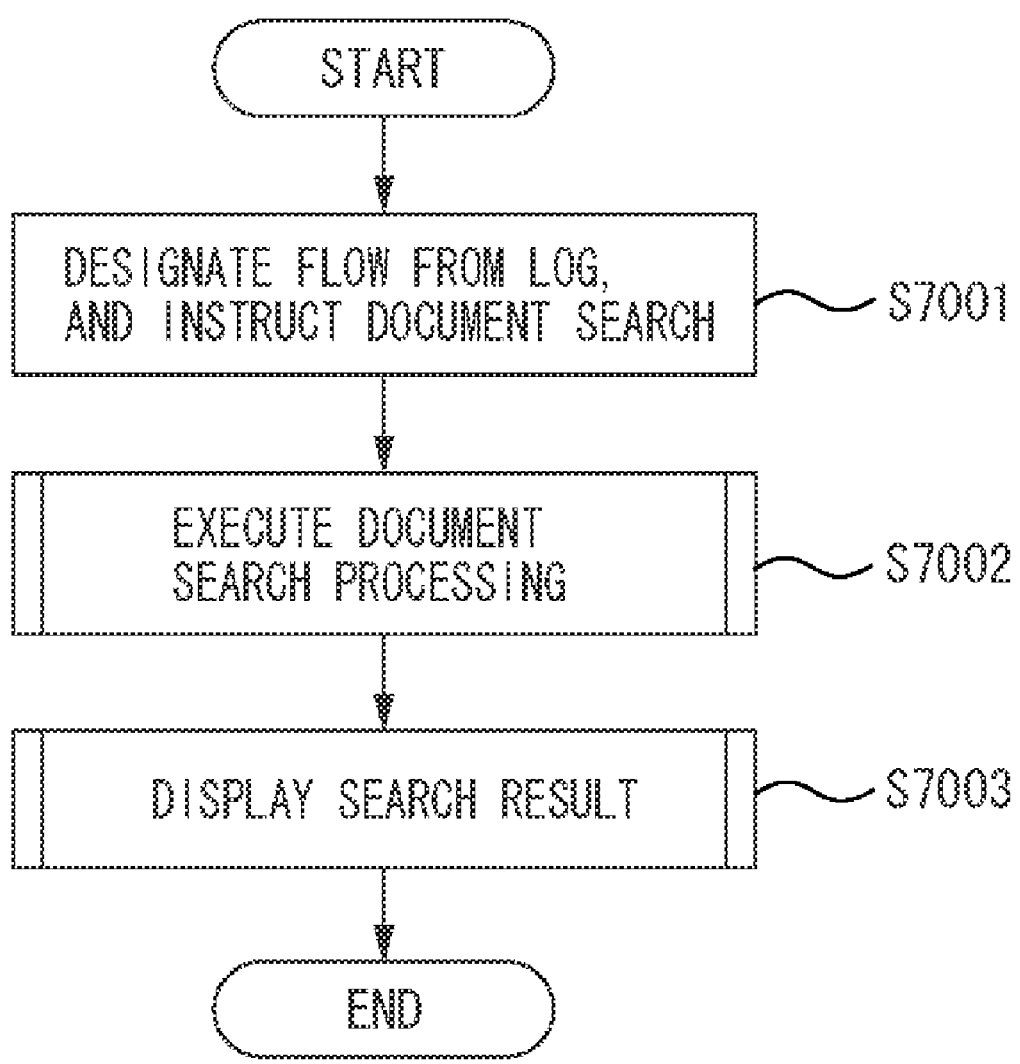

FIG. 11

| Device | Document Information | Status | Date |
|---|---|---|---|
| Device A | 01/Scan0103 | OK | 2007/09/28 08:45:13 |
| Device B | 03/Rcv033 | OK | 2007/09/28 10:20:15 |
| Device C | 05/Doc20070928 | OK | 2007/09/29 11:12:24 |
| Device C | 06/Merge20071001 | OK | 2007/10/01 17:23:44 |

WORKFLOW EXECUTION SYSTEM, WORKFLOW EXECUTION APPARATUS, AND CONTROL METHOD FOR THEM

BACKGROUND OF THE INVENTION

1. Field of the Invention

The present invention relates to a workflow system which implements a document workflow by sending and receiving document data among image forming apparatuses connected to a network and capable of communicating with each other, and particularly to search processing for data used in a workflow.

2. Description of the Related Art

In recent years, digital multifunction peripherals to which many functions are added using a digital copy machine as the nucleus have become commercially practical. That is, the digital multifunction peripheral performs a facsimile communication using a scanner and a printer which are originally equipped in the digital copy machine. Further, the multifunction peripheral rasterizes code data sent from a computer into bitmap data to perform printout using the printer. Further, the multifunction peripheral sends images loaded from the scanner onto the network using the scanner, and prints the images transmitted from the network using the printer. Such a function addition prevails. Furthermore, some digital multifunction peripherals have a box function added. That is, a storage device of the digital multifunction peripheral has regions for each user individual and department, and printer images and scan images and documents have been stored previously therein, and are output when the user desires.

The recent years have also seen the emergence of a digital multifunction peripheral which is provided with a Java execution environment therein, and enables a desired application execution.

A Java program used in the digital multifunction peripheral has functions which cooperate with scan, print, send, and box functions of the digital multifunction peripheral. There exist Java programs for, for instance, optical character reader (OCR), translation, document management, and document storage.

A system which implements a workflow by a plurality of digital multifunction peripherals connected to a network, by utilizing such functions is also discussed. For instance, in an approval flow of an application form, first, an applicant scans the application form, and sends data to an approver. The approver, upon receiving the data, performs approval processing, and sends the data to a next approver. A case is cited in which a final approver notifies the applicant of approval and permission, and in addition, stores the application form in a designated server or the like.

Further, there is available a document search system, which is, by associating a document found by a search engine with management information of a work process, capable of searching for a document of the associated work process (Japanese Patent Application Laid-Open No. 2000-250922).

Further, there is available a document management apparatus, which, even if movement of a document or change of document name or the like occurs within a document management system, enables a user to track its history, and to extract the corresponding document using an identifier of the document which a client memorizes before then (Japanese Patent Application Laid-Open No. 2001-357051).

In the above-described example, a system which executes a workflow is such a normal workflow system that includes a server for managing the workflow and controls the workflow.

SUMMARY OF THE INVENTION

The present invention is directed to an apparatus which, even if a file name used in a workflow for each apparatus is changed, enables search for a file used in the workflow, in a system which implements the workflow by a plurality of apparatuses (workflow execution apparatuses) while cooperating with each other in serverless environment.

According to an aspect of the present invention, a workflow execution apparatus connected to a network and configured to execute a workflow by sending and receiving document data includes an input unit configured to input a document, a job processing execution unit configured to execute job processing according to a workflow on the document input by the input unit, a sending unit configured to send the document on which the job processing has been executed by the job processing execution unit, a document storage unit configured to store the document input by the input unit or the document on which the job processing has been executed by the job processing execution unit, a job log storage unit configured to store as a job log a job processing content executed on the document by the job processing execution unit, a document search unit configured to search for a document stored in the document storage unit using a document name as a search key, a log search unit configured to search for a log content of the job log stored in the job log storage unit using a document name as a search key, a determination unit configured to determine whether a document having the search key has been sent by the sending unit from the workflow execution apparatus to an external apparatus, based on a job processing content indicated by the job log as a result of search by the log search unit, a search request execution unit configured to execute a search request for the document having the search key to the external apparatus, if it is determined by the determination unit that the document having the search key has been sent to the external apparatus, a receiving unit configured to receive a search result of the search request from the external apparatus, and a search result output unit configured to output a search result by the document search unit and the search result received by the receiving unit as a search result of the document having the search key.

According to another aspect of the present invention, a workflow execution apparatus connected to a network and configured to execute a workflow by sending and receiving document data includes a receiving unit configured to receive a document, a job processing execution unit configured to execute job processing according to a workflow on the document received by the receiving unit, a document storage unit configured to store the document received by the receiving unit or the document on which the job processing has been executed by the job processing execution unit, a job log storage unit configured to store as a job log a job processing content executed on the document by the job processing execution unit, a search request receiving unit configured to receive a search request from an external apparatus, a document search unit configured to search for a document stored in the document storage unit using a search condition included in the search request received by the search request receiving unit as a search key, a log search unit configured to search for a log content of the job log stored in the job log storage unit using the search condition included in the search request received by the search request receiving unit as a search key, an extraction unit configured to extract a document name from the job log corresponding to the search key, as a result of the search by the log search unit, and a reply unit configured to send to the external apparatus a reply indicating the document name extracted by the extraction unit.

According to yet another aspect of the present invention, a workflow execution system includes a first workflow execution apparatus and a second workflow execution apparatus, which are connected to a network and configured to execute a workflow by sending and receiving document data to/from each other. The first workflow execution apparatus including an input unit configured to input a document, a first job processing execution unit configured to execute job processing according to a workflow on the document input by the input unit, a sending unit configured to send the document on which the job processing has been executed by the first job processing execution unit, a first document storage unit configured to store the document input by the input unit or the document on which the job processing has been executed by the first job processing execution unit, a first job log storage unit configured to store as a job log a job processing content executed on the document by the first job processing execution unit, a first document search unit configured to search for a document stored in the first document storage unit using a document name as a search key, a first log search unit configured to search for a log content of the job log stored in the first job log storage unit using a document name as a search key, a determination unit configured to determine whether the document having the search key has been sent by the sending unit from the first workflow execution apparatus to the second workflow execution apparatus, based on a job processing content indicated by the job log as a result of search by the first log search unit, a search request execution unit configured to execute a search request for the document having the search key to the second workflow execution apparatus, if it is determined by the determination unit that the document having the search key has been sent to the second workflow execution apparatus, a search result receiving unit configured to receive a search result of the search request from the second workflow execution apparatus, a search result output unit configured to output the search result by the first document search unit and the search result received by the search result receiving unit as a search result of the document having the search key. The second workflow execution apparatus including a receiving unit configured to receive a document, a second job processing execution unit configured to execute job processing according to a workflow on the document received by the receiving unit, a second document storage unit configured to store the document received by the receiving unit or the document on which the job processing has been executed by the second job processing execution unit, a second job log storage unit configured to store as a job log a job processing content executed on the document by the second job processing execution unit, a search request receiving unit configured to receive the search request from the first workflow execution apparatus, a second document search unit configured to search for a document stored in the second document storage unit using a search condition included in the search request received by the search request receiving unit, a second log search unit configured to search for a log content of the job log stored in the second job log storage unit using the search condition included in the search request received by the search request receiving unit, an extraction unit configured to extract a document name from the job log corresponding to the search condition included in the search request, as a result of the search by the second log search unit, and a reply unit configured to send to the first workflow execution apparatus a reply indicating the document name extracted by the extraction unit.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 6 illustrates an example of a format of log information (workflow log, job log) stored on a workflow execution apparatus according to an exemplary embodiment of the present invention.

FIG. 7 is a flowchart illustrating processing performed during a period from document search instruction until a search result is displayed according to an exemplary embodiment of the present invention.

FIG. 11 illustrates an example of a search result screen displayed on a workflow execution apparatus according to an exemplary embodiment of the present invention.

DESCRIPTION OF THE EMBODIMENTS

Various exemplary embodiments, features, and aspects of the invention will be described in detail below with reference to the drawings.

A system which executes a normal workflow is such a workflow system that includes a server that manages and controls a workflow.

However, there exist the needs of users that users cannot afford to form a large-scale system from viewpoint of costs, or users would not like to install a server from operational viewpoint.

Figure 1:
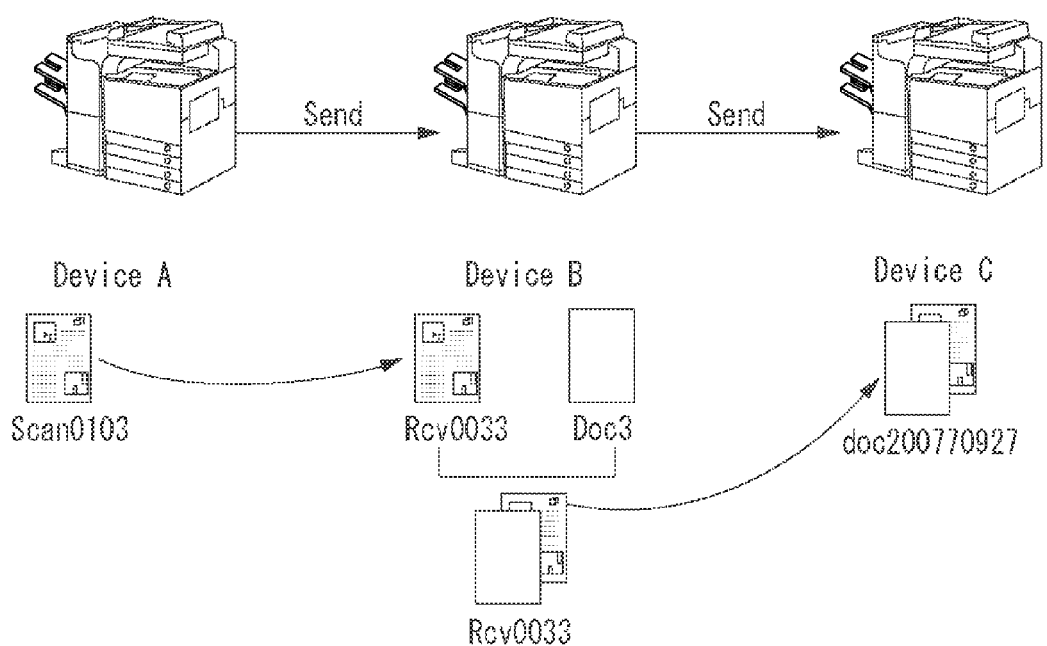
FIG. 1 is a conceptual diagram illustrating changes of a document name when executing a workflow among workflow execution apparatuses according to an exemplary embodiment of the present invention.

Hence, a system is also being developed, which achieves a workflow by exchanging documents and specifications which contain descriptions of processing for the documents among respective devices, in serverless configuration. This is a system which achieves the workflow by executing job processing using functions by respective devices according to the workflow specification. The function unit is a unit of job processing execution. For instance, a workflow desired to cause each device (digital multifunction peripheral) to execute processing using separate functions. For instance, like a case in FIG. 1, namely, "a certain device executes scanning, and sends scanned document to a next device. A receiving device combines a document previously stored within the device with a sent document, and sends combined document to a next device. A device which has received the result performs outputting to a paper medium and registration processing with a server". In such a case, a document used in the workflow will be stored on the device as an intermediate product, or a final result, and attribute information such as a document name when stored, and the like will depend on the specification of each device. In the preceding example, in Device A, a document is stored with the name of "Scan0001" assigned during scanning. Then, in Device B, the document is stored with the name of Rcv0001 assigned during reception. Then, in Device C, the document is stored with the name of doc20070927 assigned during reception.

In the present invention, attention is focused on a system, as described above, that is serverless and achieves a workflow by allowing the functions of respective devices (digital multifunction peripherals) to cooperate with each other.

In such a workflow system, in a situation in which related documents used in the workflow are stored in respective devices, a method called search is conceivable for a user to obtain these documents. However, the following problems exist when a certain device makes a request for search to respective devices.

1) Even if other devices, which receive an instruction for search performs the search using search condition prepared by a device which gives the instruction for the search, a desired document is not always retrieved. For instance, even if the Device A would issue a search instruction to the Device B under document name "Scan0001", the same document is stored under Rcv0001 in the Device B, and thus it can not be retrieved.
2) By reason that a destination to which a search instruction is issued cannot be identified, the search instruction will be eventually issued by broadcast, and consequently an increase in network loads, profligate use of resources by search execution on unnecessary devices and the like will occur.
3) When a workflow as described above is implemented by a plurality sets of personal computers (PCs) or devices, it is common practice to perform concentrated management of the workflow using a workflow server. In such a case, similar to the conventional example, it is only necessary to store the workflow and the document in advance in association with each other. However, a server which manages the workflow is required, and as a result, a hurdle of an initial investment for realizing an unsophisticated workflow is raised.

The present invention relates to a system which can achieve search for a document used in a workflow, even when realizing the workflow by respective devices while cooperating with each other without a server which performs the concentrated management of the workflow.

Figure 2:
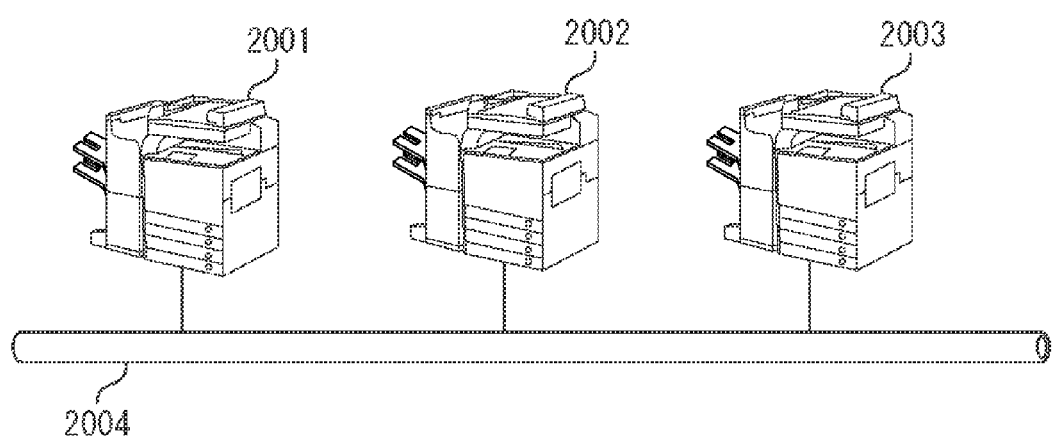
FIG. 2 is a configuration diagram illustrating a network containing workflow execution apparatuses according to an exemplary embodiment of the present invention.

FIG. 2 illustrates a configuration of a network containing workflow execution apparatuses according to an exemplary embodiment of the present invention. A workflow execution apparatus in the present exemplary embodiment is the image forming apparatus having a scan function, a print function, a data send and receive functions, and an image store function within the device. In the present specification, workflow execution apparatus may be called flow execution apparatus, or digital multifunction peripheral, or multifunction peripheral (hereinafter, abbreviated as MFP), or device. Further, FIG. 2 illustrates an example of a configuration of a workflow system used in the workflow execution apparatus according to an exemplary embodiment of the present invention, and another configuration is also possible. For instance, it is also possible to form a system with two sets of workflow execution apparatus, or with ten sets of workflow execution apparatuses, or to form a system utilizing a plurality of sets of servers as a final storage destination of documents. The server is simply a storage destination of the documents and does not have a function for managing the entire workflow.

As illustrated in FIG. 2, an MFP 2001 together with MFPs 2002 and 2003 are contained in a local area network (LAN) 2004 composed of Ethernet and the like. Hereinbelow, the MFP 2001 will be described, but the MFPs 2002 and 2003 are assumed to have basically equivalent functions. The MFP 2001 has a copy function, a facsimile function, and in addition, has a data send function for reading out original image and sending the read and acquired image data to respective apparatuses on the LAN 2004.

The send function is achieved by using e-mail, file transfer protocol (FTP), or file-sharing via server manage block (SMB) or the like.

The MFP 2001 can store images read out by the MFP 2001, and images received from other MFPs connected onto the LAN 2004, in designated user storage region of a hard disk 3004 (FIG. 3) within the MFP 2001. Such a file storage function is called box function. Further, the MFP 2001 can print the images stored in the user storage region. Furthermore, the MFP 2001 can read a workflow file which has described an image read function, a facsimile function and the like which the MFPs have, and also execute processing according to description contents. The workflow file may be also called workflow specification, or workflow description.

Further, the MFP 2001 is designed to be able to execute a Java program, and to install and execute an arbitrary application program necessary for the workflow execution. The Java program used in the MFP 2001 has a function for cooperating with scan, print, send, box functions of the MFP 2001. There exist Java programs for, such as, for instance, optical character reader (OCR) and translation, document management. Accordingly, it is possible to execute a workflow, as an example, of subjecting a scanned image to OCR, translating a text subjected to OCR, and sending by e-mail a document file to which the translation is output.

Figure 3:
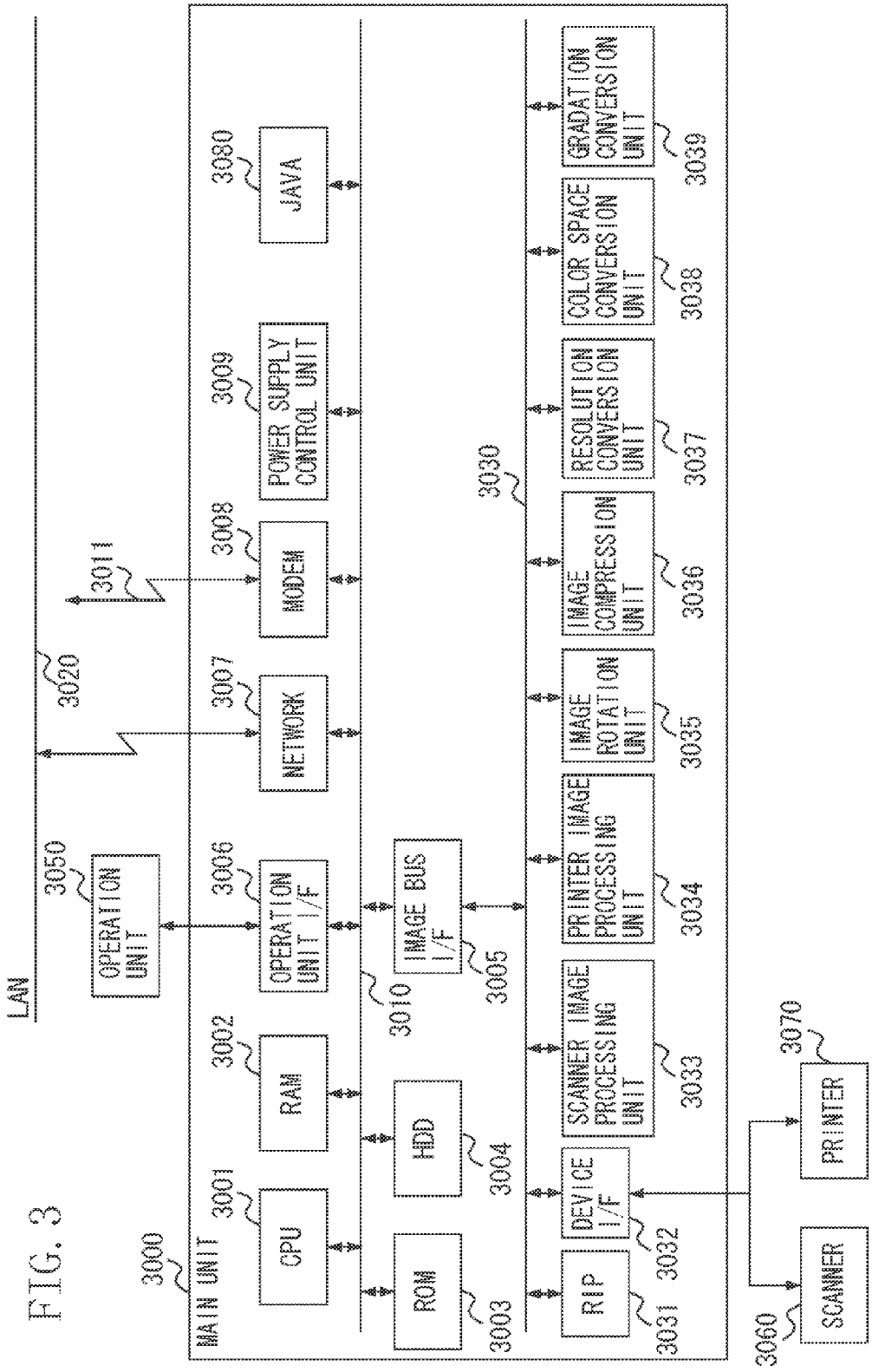
FIG. 3 is a block diagram illustrating a hardware configuration of a workflow execution apparatus according to an exemplary embodiment of the present invention.

FIG. 3 is a block diagram illustrating a hardware configuration of the MFP 2001 illustrated in FIG. 2.

A main unit 3000 is a controller for performing input and output of document data, image information, and device information. The main unit 3000 is connected to a scanner 3060 serving as an image input device, and to a printer 3070 serving as image output device, thereby achieving the scan and print functions and the like. Further, the main unit 3000 is connected to external devices via a LAN 3020 so that sending and receiving of data is implemented, and also connected to a public line (PSTN) 3011, so that a facsimile (FAX) function is implemented. The main unit 3000 is connected to an operation unit 3050 as an interface for providing these functions to users.

A central processing unit (CPU) 3001 is a controller which controls the entire main unit 3000. A random-access memory (RAM) 3002 is a system work memory for the CPU 3001 to operate, and it is used as an image memory for temporarily storing image data. A read-only memory (ROM) 3003 is a boot ROM, in which a boot program of the system is stored.

A hard disk drive (HDD) 3004 stores system software, image data, and attribute data thereof and other user data. Further, images for temporary storage are also stored in the HDD 3004.

An operation unit interface (I/F) 3006 is an interface unit with an operation unit (user interface (UI)) 3050, and outputs image data, which is displayed on the operation unit 3050, to the operation unit 3050. Further, the operation unit I/F 3006 plays a role to pass information, which a system user has input from the operation unit 3050, to the CPU 3001.

A network 3007 is connected to the LAN 3020 to perform input/output operations of the information to/from external devices such as other MFPs and PCs connected onto the LAN. The system is assumed to support a transmission control protocol/Internet protocol (TCP/IP) as a network communication protocol, and to communicate with the external devices according to the TCP/IP communication protocol.

A modem 3008 is connected to the public line 3011 to perform input/output operations of image information to/from FAX apparatuses arranged on a communication line using the FAX function.

A power supply control unit 3009 controls a power supply which supplies electric power to each block in the main unit 3000 and the operation unit 3050, the scanner 3060, and the printer 3070, according to instructions from the CPU 3001. Further, the power supply control unit 3009 stops the mains supply to the scanner 3060, the printer 3070, and the operation unit 3050 in a power-saving mode.

A Java 3080 is an execution environment of the Java program. A Java Runtime Environment (JRA), which is the execution environment of the Java program, is executable.

The above-described device module is arranged on a system bus 3010.

An image bus I/F 3005 is a bus bridge which connects an image bus 3030 and image bus 3030 which transfers the image data at high speed, and converts a data structure. The image bus 3030 is constituted by peripheral component interconnect (PCI) bus or Institute of Electrical and Electronic Engineers (IEEE) 1394.

The following devices are arranged on the image bus 3030. A raster image processor (RIP) 3031 rasterizes page data language (PDL) code input from PCs arranged on the LAN 3020 into a bitmap image. A device I/F unit 3032 connects the scanner 3060 and the printer 3070 serving as image input/output devices and the main unit controller 3000, and performs conversion of synchronous and asynchronous systems of the image data.

A scanner image processing unit 3033 performs correction, processing, and edition on input image data. Further, the scanner image processing unit 3033 has a function for judging whether the input image is color original or monochrome original from color saturation signal of the image, and holds the result.

A printer image processing unit 3034 performs correction, processing, and edition on output image data. An image rotation unit 3035 reads an image from the scanner 3060, in cooperation with the scanner image processing unit 3033 and at the same time can rotate the image and store it on the memory, and further can rotate an image which is present on the memory. After that, the image rotation unit 3035 stores the rotated image on the memory, or can perform a print output operation while rotating the image which is present on the memory in cooperation with the printer image processing unit 3034. A resolution conversion unit 3037 performs resolution conversion processing on the image that is present on the memory, and stores processed image on the memory. A color space conversion unit 3038 converts, for instance, a YUV image that is present on the memory into an Lab image, by matrix arithmetic, and stores the converted image on the memory. A gradation conversion unit 3039 converts, for instance, an image of 8 bits, 256 gradations, which is present on the memory, into an image of 1 bit, 2 gradations by a technique such as error diffusion processing, and stores the converted image on the memory. An image compression unit 3036 performs compression and expansion processing of joint photographic experts group (JPEG) on multivalued image data, and of joint bi-level image experts group (JBIG), modified modified READ code (MMR), modified READ code (MR), modified Huffman (MH) on binary image data.

The image rotation unit 3035, the resolution conversion unit 3037, the color space conversion unit 3038, the gradation conversion unit 3039, and the image compression unit 3036 can operate in conjunction with each other. For instance, when performing an image rotation, resolution conversion on an image which is present on the memory, the both processings can be performed without involvement by the memory.

Figure 4:
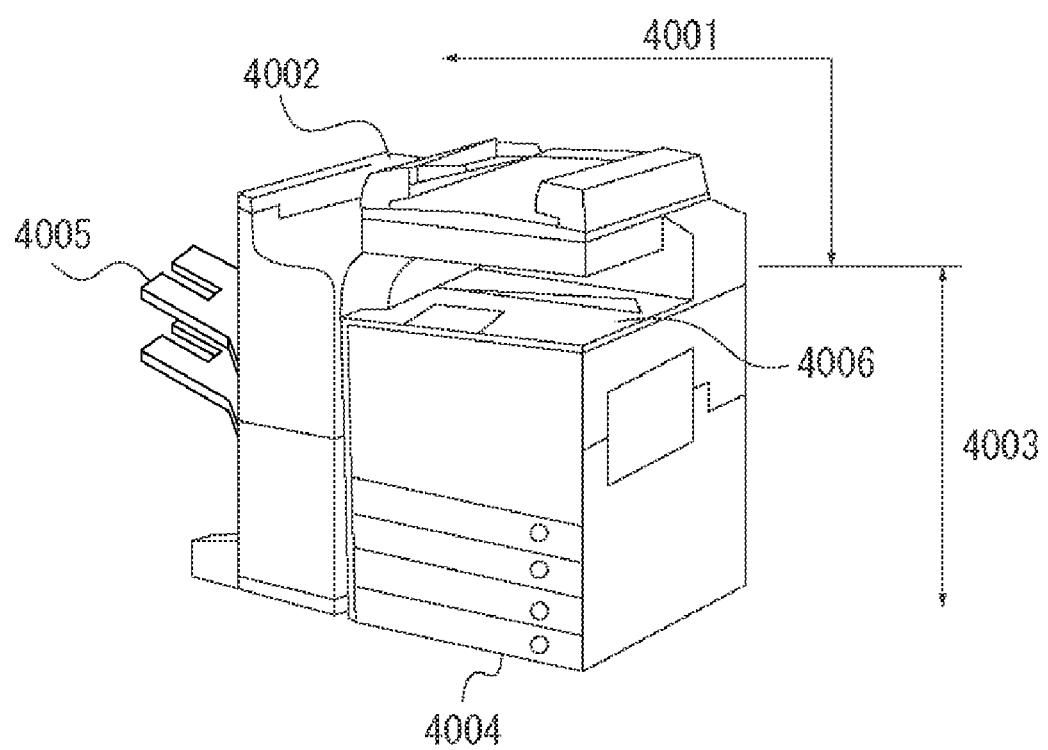
FIG. 4 is an appearance diagram of a workflow execution apparatus according to an exemplary embodiment of the present invention.

FIG. 4 illustrates an appearance of the workflow execution apparatus (image forming apparatus) according to an exemplary embodiment of the present invention. The image forming apparatus is provided to users as an MFP having a document copy function, a fax function, a printer function, and a document management function.

A scanner section 4001 serving as an image input device irradiates light on an image on paper serving as an original, and converts the image into an electric signal as raster image data by scanning using a charge-coupled device (CCD) line sensor. When a user of the system gives instructions for starting to read via an operation section 4006, a main unit controller CPU 3001 illustrated in FIG. 3 provides instructions to the scanner 3060, an original feeder 4002 feeds original sheets one by one, and the scanner performs an original reading operation.

A printer section 4003 serving as an image output device is a section where raster image data is converted into an image to be printed on a sheet. A printing process includes an electrophotographic process using photosensitive drums or photosensitive belts, an ink jet process for directly printing an image on the sheet by ejecting ink from a fine nozzle array, and other processes, but any process may be available.

The print instruction is started with the instruction from the controller CPU 3001. The printer section 4003 includes a plurality of sheet feed stages 4004 so that different sheet sizes or different sheet orientations can be selected, and it is used by setting the corresponding sheet cassette. Further, a sheet discharge tray 4005 receives sheets on which printing has been completed, and also enables settings of sorting, stapling, and the like according to instructions from the controller CPU 3001.

Figure 5:
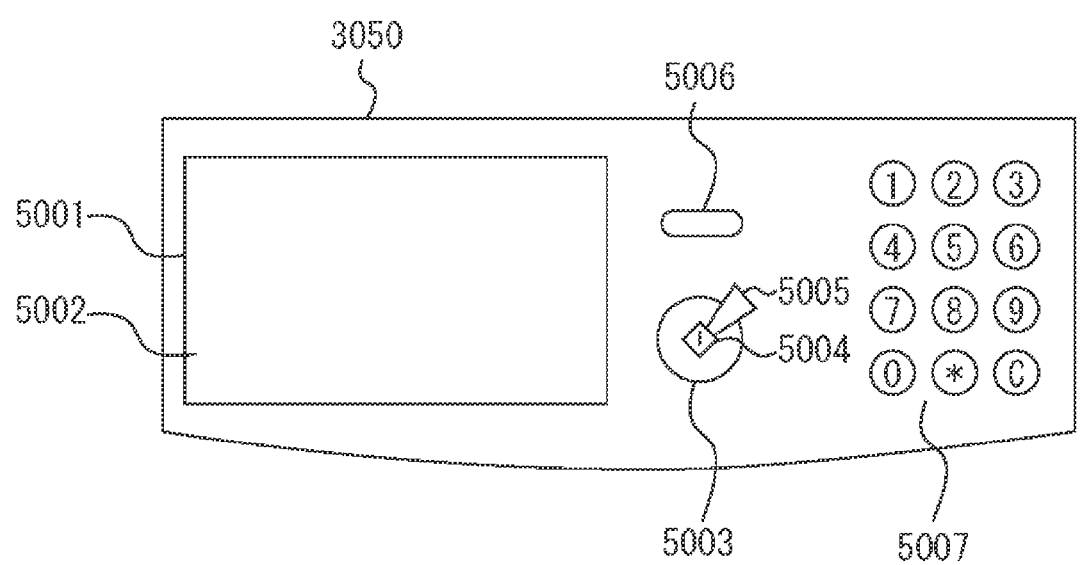
FIG. 5 is a configuration diagram illustrating an operation unit of a workflow execution apparatus according to an exemplary embodiment of the present invention.

FIG. 5 is a configuration diagram of the operation unit 3050. An LCD display section 7001 includes a touch panel sheet 5002 which is stuck and fixed on the LCD surface. The touch panel sheet 5002 displays thereon an operation screen of the system and a software key, and in addition, when a displayed key is pressed, informs its location information to the controller CPU 3001. A start key 5003 is used, for instance, to start a reading operation for an original image. The start key 5003 includes a two-color (green and red) LED 5004 in the midsection. The color indicates whether the start key 7003 is in usable status. A stop key 5005 is used to stop the operation being operated. A reset key 5006 is used to initialize a setting from the operation unit 3050. A numeric keypad 5007 is used to input fax number, number of copies, and so forth.

A search start button in the apparatus is displayed on the display section 5001, and it is manipulated by the software key of the touch panel sheet 5002. Further, a search result is also displayed on the display section 5001.

FIG. 6 illustrates an example of a format of log information stored on the workflow execution apparatus (MFP) in the workflow system illustrated in FIG. 2. A user can confirm a result of a job processing execution by displaying in the format as it is on the display section 5001. The data is stored in the HDD 3004.

In the comparison with FIG. 2, the MFP 2001 is to be regarded as Device A, the MFP 2002 as Device B, and the MFP 2003 as Device C.

A format 6010 is a format of workflow logs stored on the Device A. The format of log information is composed of No, Flow ID, Related Document, Status, and Date. No is used to identify log. Flow ID is used to identify a processed workflow. In Related Document, document information used in processing is stored. In Status, a result or status of the job is stored. In Date, date when the job was processed is stored.

A format 6020 is a format of job logs stored on the Device A. Job herein used refers to job processing content of one function unit such as copy, send, and scan which operate on the device.

The information stored in a log is composed of No, Job Type, Source, Destination, Status, and Date. No is used to identify log. Job Type is used to identify type of job. In Source, previous document information used in processing is stored. In Destination, document information after completion of the processing is stored. In Status, a result or status of the job is stored. In Date, date when the job was processed, is stored.

A format 6030 is a format of job logs stored on the Device B. The job log storage is performed in a hard disk drive of each device (MFP). A relationship between job log and search for document will be described using the above-described formats 6010, 6020, and 6030.

As described above, the log information is displayed on the display section 5001 of a device, so that a user can confirm it. When the user desires a search for a document related to the workflow of No 01003 given in line 6011 from the workflow log format 6010, it is judged from Related Document of the log information that a processed document in the Device A be "01\Scan0103". Therefore, the user executes a document search in the device using the document name "01\Scan0103" as a keyword, and collects desired document information. Further, document name "01\Scan0103" is a notation which means a save path of "01" and a file name of "Scan0103".

Next, a log search is performed within the job log format 6020 using the keyword "01\Scan0103", and a job in which a document has been sent to outside the Device A is found out. In the job log format 6020, job logs in which "01\Scan0103" is used are found out from log content. It can be seen that job logs 6021 and 6022 are equivalent thereto, but as a job log in which a document has been sent to outside the Device A, the job log 6022 is equivalent thereto. A content, which the job log 6021 indicates, includes "Scan to BOX" as Job Type, and "01\Scan0103" as Destination. In other words, the job log 6021 indicates that an original scanned in the Device A is stored as a document in a box, and the save path and file name is document name of "01\Scan0103". Similarly, a content indicated by the job log 6022 includes "Send from BOX" as Job Type, and the Device B as Destination. In other words, the job log 6022 indicates that the document name "01\Scan0103" was sent from the box of the Device A and the destination is the Device B.

In this way, when a related document is searched from the workflow No in the Device A, the related document is identified from the workflow log. Next, a job which includes the identified document name is found from the job log of the Device A. Then, it can be judged from the Destination of the job whether a search target includes a device other than the Device A.

In the above-described example, since the job log 6022 includes the Device B, the Device A identifies the Device B as a search request destination and creates a search condition for performing the search request to the Device B, and then issues the search request to the Device B. The search condition to be created at this time includes the following items:

| | |
|---|---|
| Search request source | Device A |
| Job type | Send |
| Sending source | Device A |
| Job executing time | 2007, Sep. 28 10:20:15 |

The Device B, which has received the search request, searches within the job log 6030 according to the above-described search condition, and finds out the corresponding job log 6031. Since it is judged from the job log that a document stored within the device be a document name "03\Rcv0033", the Device B executes document search within the device using the document name "03\Rcv0033" as a keyword, and sends the result to the Device A, which is the search request source.

Next, the Device B finds out a job in which the corresponding document has been sent to a device other than the Device B by searching again within the job log 6030. Since it is judged that a document that is used within the job log be a job log 6032, the Device B creates the search request to the Device C, which is a sending destination, issues the search request, and terminates the processing. However, the Device C performs the search request execution while the search request source of the search request data described above remains to be the Device A, which is the initial search requester.

The searches are executed by recombining the search conditions using the job logs in the manner described above, and, furthermore, documents used in the workflow are searched by continuing to send the search requests to appropriate workflow execution apparatuses.

FIG. 7 is a flowchart illustrating processing performed since a user gives an instruction for searching for a document relating to a workflow until a search result is displayed, in the workflow execution apparatus of the present exemplary embodiment.

In step S7001, the user designates a desired flow from workflow logs displayed on an operation screen, and gives a search instruction relating to the flow. In step S7002, the workflow execution apparatus executes document search processing described below. After executing the document search processing, the workflow execution apparatus displays a document search result output in step S7003, and terminates the processing.

Figure 8:
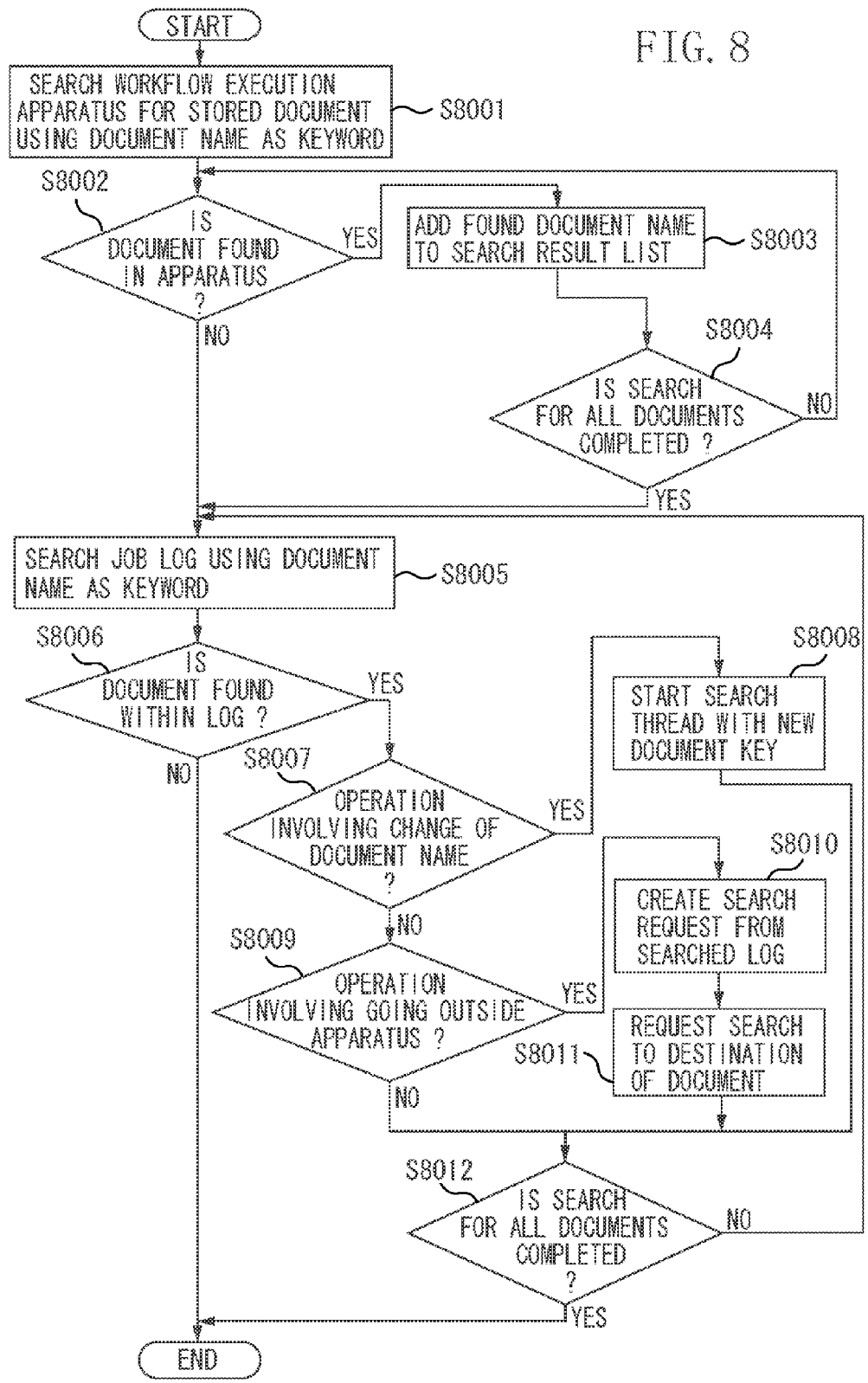
FIG. 8 is a flowchart illustrating detailed processing for a document search by a workflow execution apparatus according to an exemplary embodiment of the present invention.

FIG. 8 is a flowchart illustrating detailed processing relating to the document search described in step S7002 illustrated in FIG. 7.

In step S8001, the workflow execution apparatus executes search for stored documents in the workflow execution apparatus (MFP) using a document name described in the workflow log designated in step S7001 as a keyword. In step S8002, the workflow execution apparatus determines whether a document is found within the apparatus, as a result of the document name search in the workflow execution apparatus. If the workflow execution apparatus judges that the document is found within the apparatus (YES in step S8002), then in step S8003, the workflow execution apparatus adds found document information to a search result list. Then, in step S8004, the workflow execution apparatus determines whether search for all documents within the workflow execution apparatus is completed. If the workflow execution apparatus judges that the search for all documents has not yet been completed (NO in step S8004), then it executes again search processing.

In step S8002, if it is determined that the document is not found within the workflow execution apparatus (NO in step 5802), or in step S8004, if it is determined that all searches are completed (YES in step S8004), then in step S8005, the workflow execution apparatus executes search within the job log using a document name as a keyword. If the document corresponding to the keyword is found within the job log (YES in step S8006), then in step S8007, the workflow execution apparatus performs document name change determination, whether the processing is an operation involving a change of keyword, and in the case of the present exemplary embodiment, whether the processing is an operation involving a change of document name. If the processing is an operation involving the document name change (YES in step S8007), then in step S8008, the workflow execution apparatus newly starts a search thread using a new document name as a keyword to execute document search. In the new search thread, the workflow execution apparatus newly executes processing illustrated in FIG. 8 using a new document name as a keyword.

In step S8007, if it is judged that the processing is not an operation involving the document name change (NO in step S8007), then in step S8009, the workflow execution apparatus judges whether the processing is an operation involving going outside the workflow execution apparatus. If it is judged as an operation involving going outside the workflow execution apparatus (YES in step S8009), then in step S8010, the workflow execution apparatus creates a search request from the searched log. Then in step S8011, the workflow execution apparatus executes the search request to a workflow execution apparatus that is a sending destination of the document. The aspect of newly creating the search request based on the job log as described in FIG. 6 rather than the previous search keyword is one of features of the present exemplary embodiment.

If the workflow execution apparatus finds a document within the log, then in step S8012, the workflow execution apparatus judges whether search for all logs has been executed after completion of the processing. If the workflow execution apparatus judges that the search has not yet been completed (NO in step S8012), the processing returns to step S8005 to resume the search. If the workflow execution apparatus judges that the search for all documents is completed (YES in step S8012), or, in step S8006, that the document is not found within the log(NO in step S8006), then the workflow execution apparatus terminates the document search processing.

As described in FIG. 7 and FIG. 8, the document search processing is performed while associating the workflow log with the job log.

Figure 9:
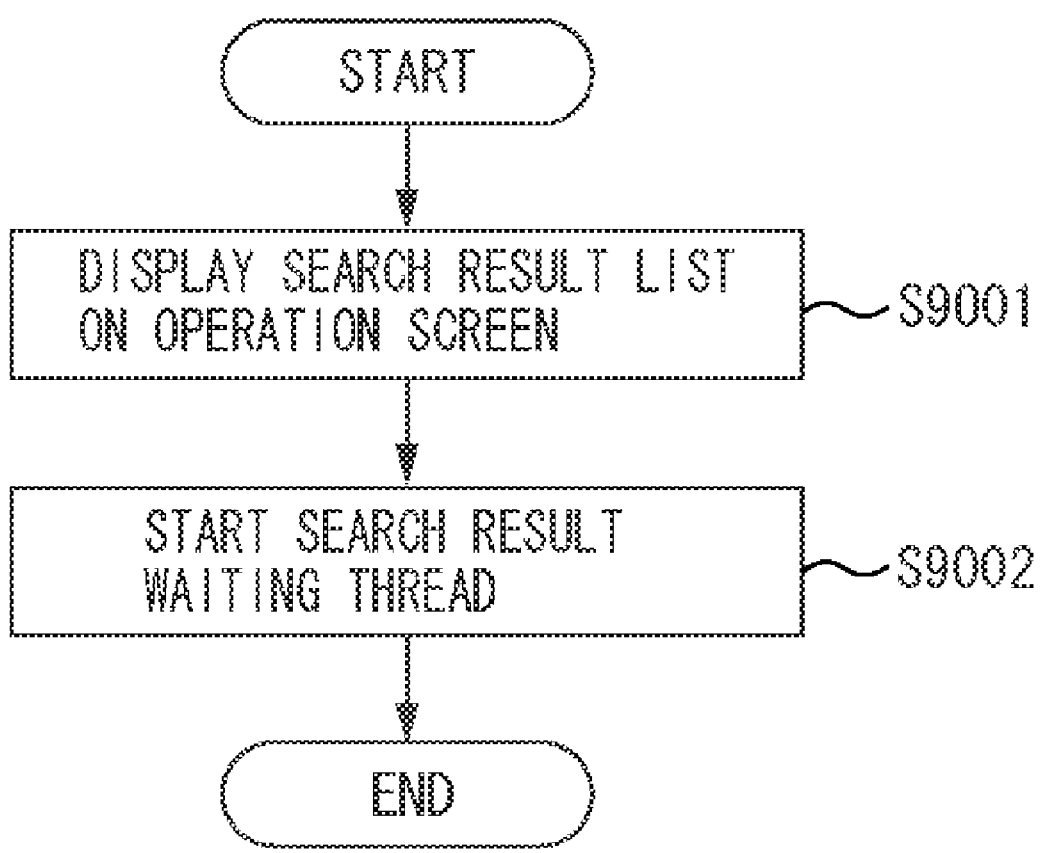
FIG. 9 is a flowchart illustrating processing for displaying a search result on a workflow execution apparatus according to an exemplary embodiment of the present invention.

FIG. 9 is a flowchart illustrating processing relating to a search result display processing described in step S7003 illustrated in FIG. 7.

In step S9001, the workflow execution apparatus displays document information of a search result list on the display section 5001. An example of display format is illustrated in FIG. 11 (described below). Next in step S9002, the workflow execution apparatus starts a search result waiting thread. In the search result waiting thread, upon receiving a result from a new document name search thread started in step S8008 or a result of the search request to another flow execution apparatus in step S8011, the workflow execution apparatus executes processing for adding the search result information to the display section 5001. The search result waiting thread continues operating until the user closes the search result display screen.

Figure 10:
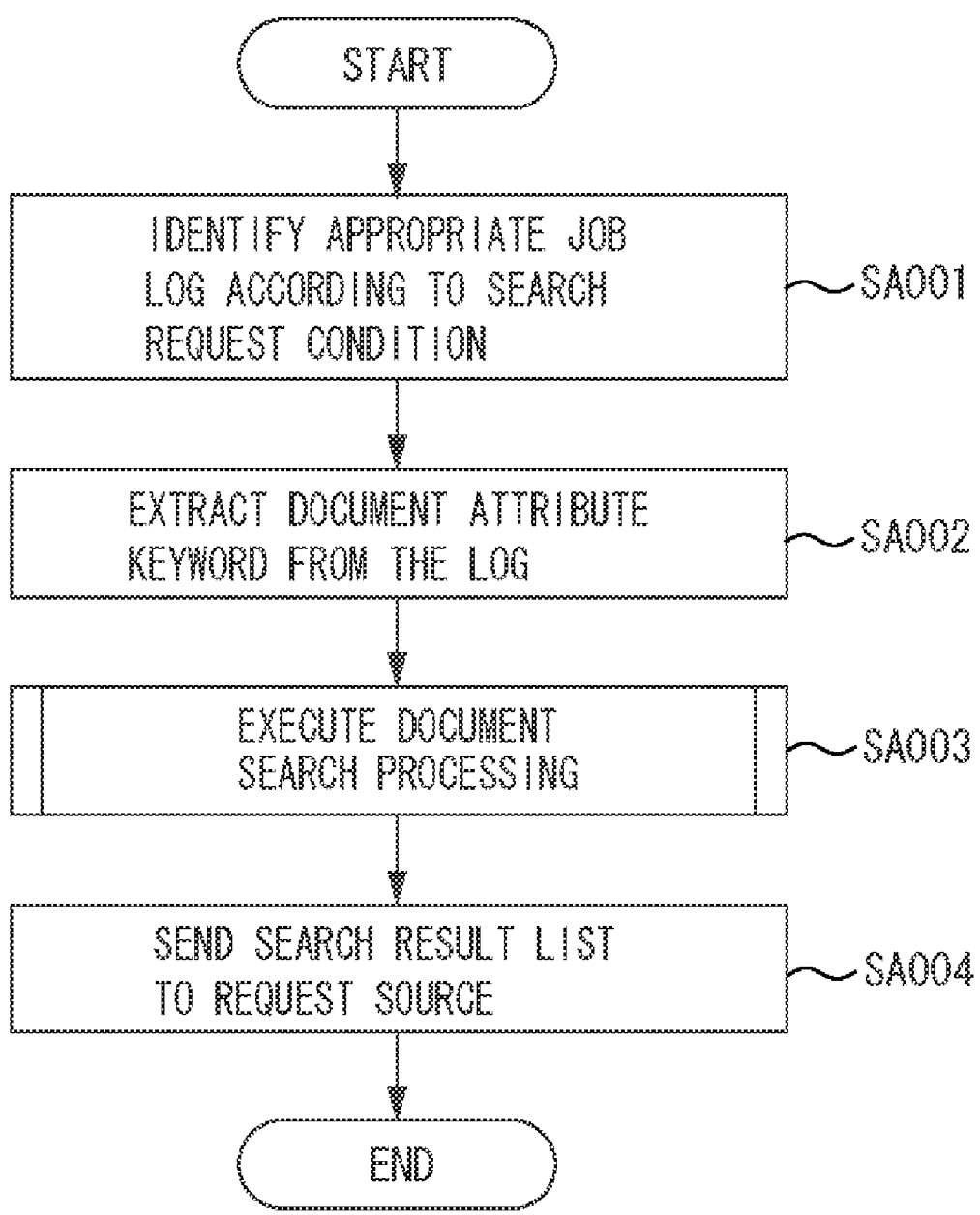
FIG. 10 is a flowchart illustrating processing performed when a workflow execution apparatus receives a search request according to an exemplary embodiment of the present invention.

FIG. 10 is a flowchart illustrating processing performed when the workflow execution apparatus receives a search request from another workflow execution apparatus.

In step SA001, the workflow execution apparatus performs a search request reception, and upon receiving the search request, searches within the job log according to the requested search condition and identifies an appropriate job log. If the job log is identified, then in step SA002, the workflow execution apparatus extracts a keyword necessary for a document name search from the log. As illustrated in FIG. 6, in the present exemplary embodiment, to execute processing using a document name as a keyword, the document name will be extracted as a keyword, but as a matter of course, a document ID or the like may be available.

When the document name is extracted as a keyword, then in step SA003, the workflow execution apparatus executes document search processing within the device itself. The document name search processing is similar to that described with reference to FIG. 8.

When the document search processing is completed, then in step SA004, the workflow execution apparatus sends a reply indicating a search result list retrieved within the device to a search request source, and then terminates the processing.

FIG. 11 illustrates an example of a search result screen display on the display section 5001 of the workflow execution apparatus.

Device name where document is stored, attribute information of document (document name), status of document, and date when the document was stored are displayed. Even after they are once displayed, when a result is returned from a device to which the search request was sent and the display section 5001 receives a search result, the search result is displayed with the data corresponding to the search result reception being appended.

The attribute information of the documents of the search result illustrated in FIG. 11 exhibits different document names, since the document names have been changed, as a result of processing at respective devices.

According to the document search processing in FIG. 7 and FIG. 8, such a workflow execution system can be realized that enables search for a document used in a workflow executed extending over workflow execution apparatuses, even if the document name has been changed in progress.

The present exemplary embodiment relates to a file search when executing a workflow among a plurality of workflow execution apparatuses (MFPs) according to descriptions of workflow specification in serverless environment. The file (document) is sent and received among the plurality of workflow execution apparatuses. In each workflow execution apparatus (MFP), job processing is executed on documents in association with processing of loaded Java program for document management and specific functions of boxes and the like of the apparatus. First, when a search for file is performed in a certain workflow execution apparatus, first, a file name search is performed on storage regions within the apparatus. Next, it is searched from a log whether the file name is changed, as a result of the job processing within the workflow execution apparatus. If the file name is changed, the changed file name is returned as a search result. Next, it is searched from the log whether the searched file is sent to another workflow apparatus as a result of the workflow processing. If the searched file is sent to another workflow execution apparatus, a search request is made to another workflow execution apparatus. In another workflow execution apparatus which has received the search request, similar search processing is performed. Similar search processing refers to a file name search within the apparatus, a tracking search when the filename is changed, a search whether the file is sent to another apparatus, and a search request to another apparatus. The apparatus, which has received the search request, performs the search processing and returns a search result to a workflow execution apparatus of the search request source. The workflow execution apparatus, which has received the search result, combines the search result within the self-apparatus and the received result of the search request to output (display) as search results. As described above, the present exemplary embodiment provides a system, an apparatus, and a method for searching for a file name (document name) in such a workflow system. Even if a document name has been changed in the job processing involved in the workflow within the workflow execution apparatus or another workflow execution apparatus, tracking of the document can be performed Further, the present invention relates to a workflow execution system that includes a plurality of workflow execution apparatuses connected to a network such as LAN, and execute a workflow by sending and receiving document data, which is realized by the following configuration.

A first workflow execution apparatus is an MFP, which includes the following configuration.

The first workflow execution apparatus includes a first job processing execution module which includes an input module for inputting a document, and executes job processing on the input document according to a workflow. The first workflow execution apparatus sends the document on which the job processing has been executed.

The first workflow execution apparatus includes a first document storage unit which stores a document input by the input module or a document on which the job processing has been executed by the first job processing execution module.

The first workflow execution apparatus includes a first job log storage unit which stores as a job log a job processing content executed on a document by the first job processing execution module.

The first workflow execution apparatus includes a first document search module which searches for a document stored in the first document storage unit using document name as a search key, and a first log search module which searches for a log content of the job log stored in the first job log storage unit using document name as a search key.

The first workflow execution apparatus includes a determination module which determines whether a document having the search key has been sent from the first workflow execution apparatus to the second workflow execution apparatus, from a job processing content which the job log indicates, as a result of search by the first log search module.

The first workflow execution apparatus includes a search request execution module which, if it is determined that the document has been sent to the second workflow execution apparatus, executes a search request for the document to the second workflow execution apparatus.

The first workflow execution apparatus includes a search result receiving module which receives a search result of the search request from the second workflow execution apparatus, and outputs and displays the search result of the first document search module and the search result which the search result receiving module has received as search results of the document. The configuration of the first workflow execution apparatus is hereinabove described.

Next, a second workflow execution apparatus is an MFP, which includes the following configuration.

The second workflow execution apparatus includes a receiving module which receives a document, and a second job processing execution module which executes a job processing on a received document according to a workflow.

The second workflow execution apparatus includes a second document storage unit which stores the received document or a document on which the job processing is executed by the second job processing execution module, and a second job log storage unit which stores as a job log a job processing content executed on the document by the second job processing execution module.

The second workflow execution apparatus includes a search request receiving module which receives a search request from the first workflow execution apparatus, and a second document search module which searches for a document stored in the second document storage unit according to a search condition included in the search request.

The second workflow execution apparatus includes a second log search module which searches for a log content of a job log stored in the second job log storage unit, according to a search condition included in the search request.

The second workflow execution apparatus includes an extraction module which extracts a document name from a job log corresponding to a search condition included in the search request, as a result of search by the second log search module.

The second workflow execution apparatus includes a reply module which sends a reply indicating the document name extracted by the extraction module to the first workflow execution apparatus, which is a search request source. The configuration of the second workflow execution apparatus is hereinabove described.

As described above, the workflow execution system according to an exemplary embodiment of the present invention is constituted by the first workflow execution apparatus and the second workflow execution apparatus. As a matter of course, a relationship between the first and the second workflow execution apparatuses can be further applied to a third workflow execution apparatus. That is, the present invention can be applied to among a plurality of workflow execution apparatuses according to description of the workflow specification.

Hereinabove, in a system for realizing a workflow by a plurality of workflow execution apparatuses cooperating with one another in serverless environment, even if a file name used in a workflow of each apparatus is changed, a search for the file used in the workflow can be performed.

Further, the present invention can be implemented with, for instance, a system, an apparatus, a method, a program or a storage medium. More specifically, the present invention can be applied to a system composed of a plurality of devices, or, may be applied to an apparatus composed of one device.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment (s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2008-298168 filed Nov. 21, 2008, which is hereby incorporated by reference herein in its entirety.

What is claimed is:

1. A workflow execution apparatus including at least one processor and memory communicatively-coupled via a bus, connected to a network and configured to execute a workflow by sending and receiving document data, the workflow execution apparatus comprising:
an input unit configured to input a document;
a job processing execution unit configured to execute job processing according to a workflow on the document input by the input unit;
a sending unit configured to send the document on which the job processing has been executed by the job processing execution unit;
a document storage unit configured to store the document input by the input unit or the document on which the job processing has been executed by the job processing execution unit;
a job log storage unit configured to store as a job log a job processing content executed on the document by the job processing execution unit;
a document search unit configured to search for a document stored in the document storage unit using a document name as a search key;
a log search unit configured to search for a log content of the job log stored in the job log storage unit using a document name as a search key;
a determination unit configured to determine whether a document having the search key has been sent by the sending unit from the workflow execution apparatus to an external apparatus, based on a job processing content indicated by the job log, as a result of search by the log search unit;
a search request execution unit configured to execute a search request for the document having the search key to the external apparatus, if it is determined by the determination unit that the document having the search key has been sent to the external apparatus;
a receiving unit configured to receive a search result of the search request from the external apparatus; and
a search result output unit configured to output a search result by the document search unit and the search result received by the receiving unit as a search result of the document having the search key.

2. The workflow execution apparatus according to claim 1, further comprising a document name change determination unit configured to determine whether job processing for changing a document name has been performed on the document having the search key based on the job processing content indicated by the job log, as result of search by the log search unit,
wherein if it is determined by the document name change determination unit that the job processing for changing the document name has been performed, the document search unit or the log search unit executes search using a changed document name as a new search key.

3. The workflow execution apparatus according to claim 1, wherein the search request executed by the search request execution unit to the external apparatus includes a search condition including at least one of job type, job execution time, sending source, and search request source, out of the log content of the job log searched by the log search unit.

4. A workflow execution apparatus including at least one processor and memory communicatively-coupled via a bus, connected to a network and configured to execute a workflow by sending and receiving document data, the workflow execution apparatus comprising:
a receiving unit configured to receive a document;
a job processing execution unit configured to execute job processing according to a workflow on the document received by the receiving unit;
a document storage unit configured to store the document received by the receiving unit or the document on which the job processing has been executed by the job processing execution unit;
a job log storage unit configured to store as a job log a job processing content executed on the document by the job processing execution unit;
a search request receiving unit configured to receive a search request from an external apparatus;
a document search unit configured to search for a document stored in the document storage unit using a search condition included in the search request received by the search request receiving unit as a search key;
a log search unit configured to search for a log content of the job log stored in the job log storage unit using the search condition included in the search request received by the search request receiving unit as a search key;
an extraction unit configured to extract a document name from the job log corresponding to the search key, as a result of the search by the log search unit; and
a reply unit configured to send to the external apparatus a reply indicating the document name extracted by the extraction unit.

5. The workflow execution apparatus according to claim 4, wherein the search request received by the search request receiving unit includes a search condition including at least one of job type, job execution time, sending source, and search request source.

6. A workflow execution system comprising a first workflow execution apparatus and a second workflow execution apparatus, each connected to a network and configured to execute a workflow by sending and receiving document data to/from each other,
the first workflow execution apparatus including at least one processor and memory communicatively-coupled via a bus, comprising:
an input unit configured to input a document;
a first job processing execution unit configured to execute job processing according to a workflow on the document input by the input unit;
a sending unit configured to send the document on which the job processing has been executed by the first job processing execution unit;
a first document storage unit configured to store the document input by the input unit or the document on which the job processing has been executed by the first job processing execution unit;
a first job log storage unit configured to store as a job log a job processing content executed on the document by the first job processing execution unit;

a first document search unit configured to search for a document stored in the first document storage unit using a document name as a search key;

a first log search unit configured to search for a log content of the job log stored in the first job log storage unit using a document name as a search key;

a determination unit configured to determine whether the document having the search key has been sent by the sending unit from the first workflow execution apparatus to the second workflow execution apparatus, based on a job processing content indicated by the job log as a result of search by the first log search unit;

a search request execution unit configured to execute a search request for the document having the search key to the second workflow execution apparatus, if it is determined by the determination unit that the document having the search key has been sent to the second workflow execution apparatus;

a search result receiving unit configured to receive a search result of the search request from the second workflow execution apparatus; and a search result output unit configured to output the search result by the first document search unit and the search result received by the search result receiving unit as a search result of the document having the search key, the second workflow execution apparatus including at least one processor and memory communicatively-coupled via a bus, comprising:

a receiving unit configured to receive a document;

a second job processing execution unit configured to execute job processing according to a workflow on the document received by the receiving unit;

a second document storage unit configured to store the document received by the receiving unit or the document on which the job processing has been executed by the second job processing execution unit;

a second job log storage unit configured to store as a job log a job processing content executed on the document by the second job processing execution unit;

a search request receiving unit configured to receive the search request from the first workflow execution apparatus;

a second document search unit configured to search for a document stored in the second document storage unit using a search condition included in the search request received by the search request receiving unit;

a second log search unit configured to search for a log content of the job log stored in the second job log storage unit using the search condition included in the search request received by the search request receiving unit;

an extraction unit configured to extract a document name from the job log corresponding to the search condition included in the search request, as a result of the search by the second log search unit; and a reply unit configured to send to the first workflow execution apparatus a reply indicating the document name extracted by the extraction unit.

7. The workflow execution system according to claim 6, wherein the second workflow execution apparatus further comprises a document name change determination unit configured to determine whether job processing for changing a document name on a document as a search target has been performed based on the job processing content indicated by the job log, as a result of the search by the second log search unit, and wherein if it is determined by the document name change determination unit that the job processing for changing the document name has been performed, the second workflow execution apparatus executes search by the second document search unit or the second log search unit using a changed document name as a new search condition.

8. A method for executing a workflow by sending and receiving document data via a network performed by at least one processor and memory communicatively-coupled via a bus, the method comprising:

inputting a document;

executing job processing according to a workflow on the input document;

sending the document on which the job processing has been executed;

storing the input document or the document on which the job processing has been executed in a document storage unit;

storing the executed job processing content in a job log storage unit as a job log;

searching for a document stored in the document storage unit using a document name as a search key;

searching for a log content of the job log stored in the job log storage unit using a document name as a search key;

determining whether a document having the search key has been sent from the workflow execution apparatus to an external apparatus, based on the job processing content indicated by the job log, as a result of search for the log content;

if it is determined that the document having the search key has been sent from the workflow execution apparatus to the external apparatus, executing a search request for the document having the search key to the external apparatus;

receiving a search result of the search request from the external apparatus; and outputting a search result of the document and the received search result as a search result of the document having the search key.

9. A computer-readable storage medium storing a program for causing a computer to perform the method according to claim 8.

10. A method for executing a workflow by sending and receiving document data via a network performed by at least one processor and memory communicatively-coupled via a bus, the method comprising:

receiving a document;

executing job processing according to a workflow on the received document;

storing the received document or the document on which the job processing has been executed in a document storage unit;

storing the executed job processing content in a job log storage unit as a job log;

receiving a search request from an external apparatus;

searching for a document stored in the document storage unit using a search condition included in the received search request as a search key;

searching for a log content of the job log stored in the job log storage unit using the search condition included in the received search request as a search key;

extracting a document name from the job log corresponding to the search key, as a result of the search for the log content; and sending to the external apparatus a reply indicating the extracted document name.

11. A computer-readable storage medium storing a program for causing a computer to perform the method according to claim 10.

12. A method for controlling a workflow execution system including a first workflow execution apparatus that includes at least one processor and memory communicatively-coupled via a bus and a second workflow execution apparatus that includes at least one processor and memory communicatively-coupled via a bus, each connected to a network and configured to execute a workflow by sending and receiving document data to/from each other, the method comprising:

a method for controlling the first workflow execution apparatus comprising:
inputting a document;
executing first job processing according to a workflow on the input document;
sending the document on which the first job processing has been executed;
storing the input document or the document on which the first job processing has been executed in a first document storage unit;
storing the executed first job processing content in a first job log storage unit as a job log;
searching for a document stored in the first document storage unit using a document name as a search key;
searching for a log content of the job log stored in the first job log storage unit using a document name as a search key;
determining whether the document having the search key has been sent from the first workflow execution apparatus to the second workflow execution apparatus, based on a job processing content indicated by the job log as result of search for the log content;
if it is determined that the document having the search key has been sent from the first workflow execution apparatus to the second workflow execution apparatus, executing a search request for the document having the search key to the second workflow execution apparatus;
receiving a search result of the search request from the second workflow execution apparatus;
outputting the search result of the document and the received search result as a search result of the document having the search key; and a method for controlling the second workflow execution apparatus comprising:
receiving a document;
executing second job processing according to a workflow on the received document;
storing the received document or the document on which the second job processing has been executed in a second document storage unit;
storing the executed second job processing content in a second job log storage unit as a job log;
receiving the search request from the first workflow execution apparatus;
searching for a document stored in the second document storage unit using a search condition included in the received search request;
searching for a log content of the job log stored in the second job log storage unit using the search condition included in the received search request;
extracting a document name from the job log corresponding to the search condition included in the search request, as a result of the search for the log content; and
sending to the first workflow execution apparatus a reply indicating the extracted document name.

13. A computer-readable storage medium storing a program for causing a computer to perform the method according to claim 12.

* * * * *